(12) United States Patent
Golov

(10) Patent No.: US 12,248,790 B2
(45) Date of Patent: Mar. 11, 2025

(54) AUTOMOTIVE ELECTRONIC CONTROL UNIT PRE-BOOTING FOR IMPROVED MAN MACHINE INTERFACE PERFORMANCE

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/628,600

(22) Filed: Apr. 5, 2024

(65) Prior Publication Data
US 2024/0248726 A1    Jul. 25, 2024

Related U.S. Application Data

(63) Continuation of application No. 16/374,287, filed on Apr. 3, 2019, now Pat. No. 11,954,500.

(51) Int. Cl.
G06F 9/4401 (2018.01)
B60R 16/023 (2006.01)
B60R 16/03 (2006.01)

(52) U.S. Cl.
CPC ........ *G06F 9/4408* (2013.01); *B60R 16/0231* (2013.01); *B60R 16/03* (2013.01); *G06F 9/4416* (2013.01); *G06F 9/4418* (2013.01)

(58) Field of Classification Search
None
See application file for complete search history.

(56) References Cited

U.S. PATENT DOCUMENTS

| 11,954,500 B2 | 4/2024 | Golov |
| 2009/0312940 A1 | 12/2009 | Poudrier et al. |
| 2011/0046844 A1 | 2/2011 | Honner et al. |
| 2013/0054945 A1 | 2/2013 | Free et al. |
| 2013/0054986 A1 | 2/2013 | Kim et al. |
| 2014/0195792 A1 | 7/2014 | Chew |
| 2014/0324194 A1 | 10/2014 | Larsson et al. |
| 2015/0105870 A1 | 4/2015 | Zhang et al. |
| 2015/0213555 A1 | 7/2015 | Barfield, Jr. et al. |
| 2016/0020714 A1 | 1/2016 | Wang et al. |

(Continued)

FOREIGN PATENT DOCUMENTS

| CN | 102628382 | 8/2012 |
| CN | 103192778 | 7/2013 |

(Continued)

OTHER PUBLICATIONS

International Search Report and Written Opinion, PCT/US2020/021823, mailed Jul. 6, 2020.

*Primary Examiner* — Peter D Nolan
*Assistant Examiner* — Michael F Whalen
(74) *Attorney, Agent, or Firm* — Greenberg Traurig

(57) ABSTRACT

Disclosed are devices and methods for improving the pre-booting of electronic control unit devices in vehicles. In one embodiment, a method is disclosed comprising detecting a triggering of a pre-booting condition based on one or more interactions with a vehicle; transmitting a power-on signal to at least one electronic control unit (ECU) in the vehicle, the at least one ECU operating in a low-power state; and fully booting the at least one ECU upon determining that the vehicle has been started.

30 Claims, 8 Drawing Sheets

(56) References Cited

U.S. PATENT DOCUMENTS

| | | |
|---|---|---|
| 2017/0083345 A1 | 3/2017 | Sol |
| 2018/0018179 A1 | 1/2018 | Scheufler et al. |
| 2018/0295011 A1 | 10/2018 | Wang et al. |
| 2019/0077261 A1 | 3/2019 | Choi et al. |
| 2020/0262369 A1 | 8/2020 | Kameo et al. |
| 2020/0319894 A1 | 10/2020 | Golov |

FOREIGN PATENT DOCUMENTS

| | | | |
|---|---|---|---|
| CN | 106020177 | | 10/2016 |
| CN | 206627348 | | 11/2017 |
| GB | 2515799 | | 1/2015 |
| KR | 20140080793 | | 7/2014 |
| KR | 20140080793 A | * | 7/2014 |
| KR | 20180061718 A | | 6/2018 |
| TW | 201315892 | | 4/2013 |

* cited by examiner

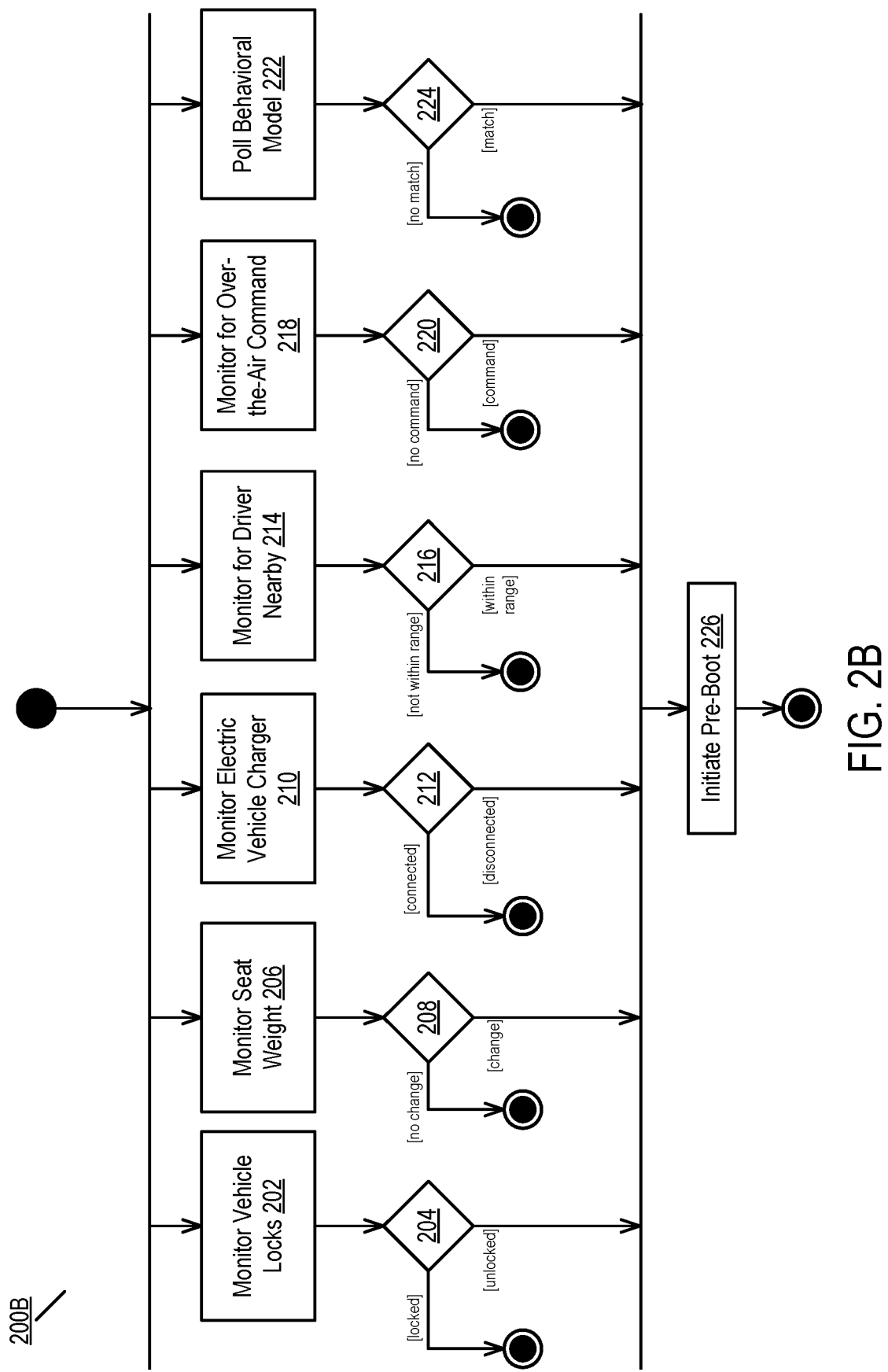

AUTOMOTIVE ELECTRONIC CONTROL UNIT PRE-BOOTING FOR IMPROVED MAN MACHINE INTERFACE PERFORMANCE

RELATED APPLICATIONS

The present application is a continuation application of U.S. patent application Ser. No. 16/374,287, filed Apr. 3, 2019, issued as U.S. Pat. No. 11,954,500, on Apr. 9, 2024, the entire disclosure of which application is hereby incorporated herein by reference.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward in-vehicle computing systems and, in particular, to devices and methods for pre-booting electronic control units (ECUs) in a vehicle.

A modern car contains dozen of ECUs. These ECUs can be used for infotainment systems or may be used as critical systems such as in autonomous vehicles. Software in ECUs generally include complex operating systems as well as application-layer software stacks. Starting this software generally can take multiple seconds, even for the simplest ECU devices. However, many ECUs on modern vehicles are required to start up as quickly as possible and, generally, within one second of start a vehicle. For example, car radio, rear-view camera, instrument clusters, network devices, and others are generally desired to start immediately when a vehicle is started. However, existing architectures of vehicles require such ECUs to be started from a powered off state only in response to a vehicle start. Thus, these ECUs are unable to provide near instantaneous startup.

The disclosed embodiments remedy these and other technical problems by providing a pre-booting procedure to speculatively boot ECUs in a vehicle based on one or more detected conditions, thereby improving the operation of the ECUs.

BRIEF DESCRIPTION OF THE FIGURES

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 2B is a flow diagram illustrating a method for detecting a pre-boot condition according to some embodiments of the disclosure.

DETAILED DESCRIPTION

The disclosed embodiments describe systems, devices, methods, and computer-readable media for pre-booting vehicle ECUs in response to detecting a pre-boot condition. Additionally, specific details on the types of pre-boot conditions and how these conditions are analyzed are provided in further embodiments. Finally, the disclosed embodiments describe how to utilize a predictive model to pre-boot ECU devices as well as refine the timing of pre-booting in response to pre-boot condition detection. The disclosed embodiments improve the time-to-start of ECU devices, resulting a perceived "instant on" effect of the ECU output.

Figure 1:
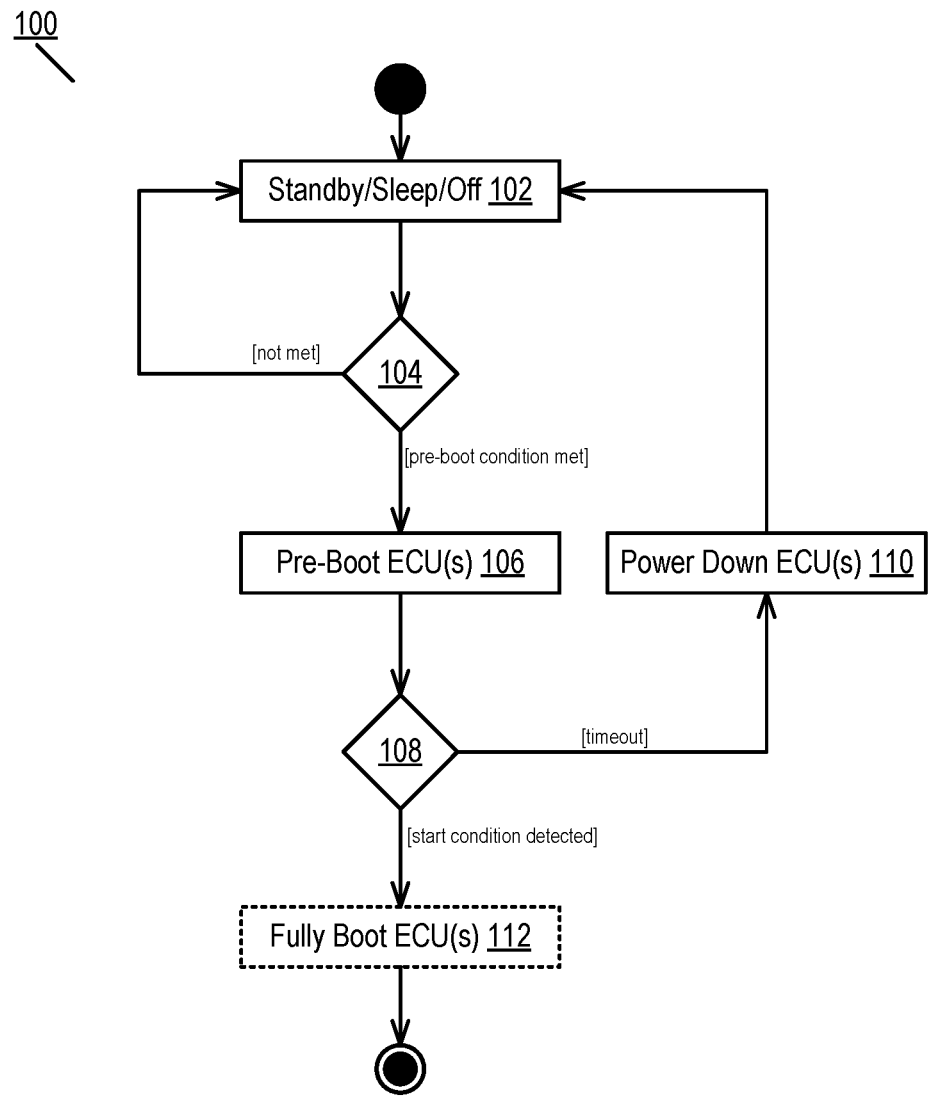
FIG. 1 is a flow diagram illustrating a method for pre-booting an ECU according to some embodiments of the disclosure.

FIG. 1 is a flow diagram illustrating a method for pre-booting an ECU according to some embodiments of the disclosure.

In block 102, one or more ECUs operate in a low-power mode such as standby, sleep, hibernation, or power off mode.

In the illustrated embodiment, a low-power mode refers to an operating mode of an electronic device (e.g., ECU) wherein some or all the functions of the device are not available or executing. In sleep or standby mode, device state is generally stored in random-access memory (RAM) while unnecessary subsystems (e.g., displays, peripherals, etc.) are powered down. Additionally, power to RAM is reduced to its lowest possible state, solely to maintain the integrity of the device state stored therein. In some modes, such as hibernation, the state of the device may additionally be saved to non-volatile storage. In this manner, the device can restart to an existing state if power to RAM is lost completely. In power off mode, all components of the device are powered off.

The specific state that a given ECU is in may vary depending on the type of ECU and the operating circumstances when a vehicle housing the ECU is turned off. In some cases, ECUs may be completely powered down, may be placed in standby mode, or may be cascaded from powered on, to standby, to powered off, according to the requirements of the ECU. In general, the ECUs of an automobile will primarily be transitioned to a low power state upon the stopping of the vehicle and removal of a car key or otherwise signaling that the vehicle is no longer in use (e.g., the removal of a key fob from within detection range of the vehicle). The specific mechanism in which an ECU is placed in a low-power state is not intended to limit the disclosed embodiments.

In block 104, the method determines if a pre-boot condition is met. Details of specific pre-boot conditions are described more fully in the descriptions of FIGS. 2 and 3A-3E and are not repeated herein in detail.

In brief, a vehicle can be equipped with a pre-boot ECU configured to execute the methods described herein. In one embodiment, this pre-boot ECU is an "always on" ECU that is configured to constantly monitor the status of various other ECUs in the vehicle. In one embodiment, the pre-boot ECU monitors a vehicle bus (e.g., a car area network bus) for signals transmitted to and from ECUs or other components. As one example, an ECU controlling the locking of doors may broadcast or transmit that it sensed a signal to unlock the doors. The pre-boot ECU monitors the bus to detect this signal and, in addition with other conditions discussed in FIG. 2, determines whether a pre-boot condition has occurred. Not all signals detected on the bus satisfy pre-boot conditions. For instance, data from a collision sensor would not trigger pre-booting of ECUs. Thus, the principal role of the pre-boot ECU is to monitor and filter signals to determine when to pre-boot other ECUs. Additionally, as described in FIGS. 3D and 3E, the pre-boot ECU can include data storage and models for predicatively pre-booting devices as well as adjusting the timing of pre-booting on a per-ECU basis. If no pre-boot condition is detected, the ECUs in low-power mode continue to operate in low-power mode (block 102).

In block 106, the method pre-boots one or more ECU(s) in response to determining that the pre-boot condition is met.

In one embodiment, pre-booting an ECU comprises transmitting a power on signal to the respective ECU. In some embodiments, pre-booting an ECU comprises issuing a wake signal to the ECU. In some embodiments, the pre-booting signal may include (or be followed by) data relating to the pre-boot condition.

In some embodiments, the method pre-boots all ECUs in a vehicle connected to a shared bus. In some embodiments, each of these ECUs can be pre-booted simultaneously. In other embodiments, the method may selectively pre-boot only a subset of the ECUs. For instance, the method may determine that in response to a driver door unlock signal, only those ECUs used immediately by the driver (e.g., navigation, dash) need to be pre-booted while others (e.g., entertainment) can be booted normally. Further description of this type of selective pre-booting is described more fully in FIG. 3D and elsewhere.

In block 108, the method determines if a timeout has expired.

In some embodiments, the timeout comprises a fixed time interval in which the system gives the ECUs to pre-boot. In other instances, the timeout can be dynamic based on the operation of the ECUs (i.e., updated based on the average time to pre-boot). In other embodiments, the method may alternatively await a signal from the ECUs indicating pre-booting has completed. Thus, blocks 108, 110, and 112 can either be executed simultaneously for all ECUs or selectively for each ECU.

Generally, block 108 comprises a failsafe to prevent unnecessary full booting of ECUs. For example, if a pre-boot condition is triggered (block 104) but a full start condition is not detected, the method then powers down the ECUs and (as described herein) updates a predictive pre-boot model. In one embodiment, a start condition comprises the starting of the vehicle by an operator (e.g., turning a key or pushing an ignition button). Generally, the start condition can comprise any definitive signal that can guarantee that a vehicle is about to be operated (e.g., a remote start command).

In block 110, If the method fails to detect a start condition within an allotted time (or fails to receive a signal indicating pre-booting is completed within an allotted time), the methods powers down the ECUs. In some embodiments, powering down an ECU comprises transmitting a power off signal (or, alternatively, a sleep, hibernate, or other low-power signal) to an ECU that is currently pre-booting. The method then continues to operate with ECUs in low-power mode (block 102) until detecting the next pre-boot condition.

In some embodiments, pre-booting the ECU(s) (block 106) may comprise fully booting the ECUs. In this embodiment, if the method determines that a start condition has been detected in block 108, the method ends as all ECUs have been fully booted.

Figure 6:
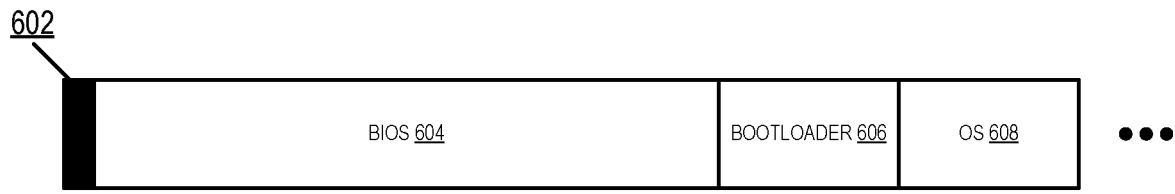
FIG. 6 is a block diagram of a boot process according to some embodiments of the disclosure.

In some embodiments, however, pre-booting an ECU does not fully boot the ECU. In this embodiment, an ECU can be configured with a basic input/output system (BIOS) that comprises a first pre-boot stage. An exemplary boot process is depicted in FIG. 6. In this process, a start condition (602) triggers an initial BIOS (604) routine which performs hardware initialization of the device booting up. After verifying the hardware, the BIOS (604) cede control to a bootloader (606) stored on a designated sector of a boot device. The bootloader (606) loads the OS (608) into RAM and cedes control to the OS (608).

In the illustrated embodiment, the bootloader (606) is configured to participate in the operations above. That is, the bootloader (606) can be initialized during the pre-boot process but is configured to wait until receiving a second signal indicating that control should be ceded to the OS (608). Alternatively, the OS (608) may be modified to pause execution immediately after loading an await an instruction to complete the boot process after a start condition is detected in block 108.

In these scenarios, once the start condition is detected in block 108, the method fully boots the pre-booted ECUs in block 112. As described above, this process may include instructing each pre-booted ECU to continue booting by transmitting a signal over a bus to the pre-booted ECUs.

Figure 2A:
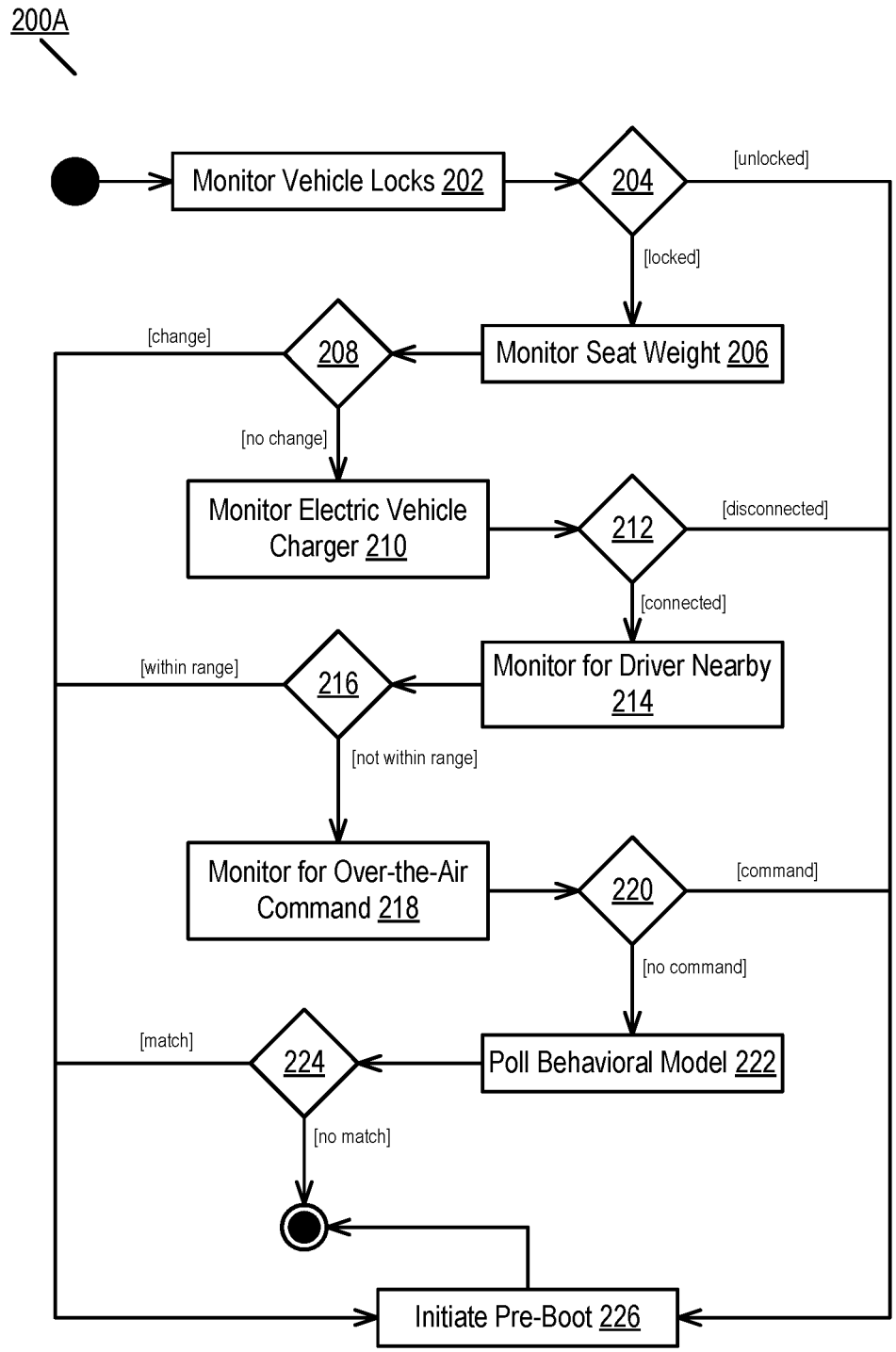
FIG. 2A is a flow diagram illustrating a method for detecting a pre-boot condition according to some embodiments of the disclosure.

FIG. 2A is a flow diagram illustrating a method (200a) for detecting a pre-boot condition according to some embodiments of the disclosure.

The illustrated embodiment describes six conditions: (1) door unlocking (202, 204); (2) driver's seat weight change (206, 208); (3) vehicle charger disconnect (210, 212); (4) nearby driver detection (214, 216); (5) over-the-air start (218, 220); and (6) predictive start (222, 224). Although illustrated as a series of conditions, the six conditions may be executed in any order. Further, not all the conditions are required and fewer than all conditions may be implemented, in any order. Further, the conditions may be executed in parallel rather than in sequence.

In blocks 202 and 204, the method (200a) monitors a vehicle's locking subsystem (202) and determines if one or more doors have been unlocked (204). If so, the method (200a) initiates pre-booting (206). If not, the method (200a) continues to block 206.

Figure 3A:
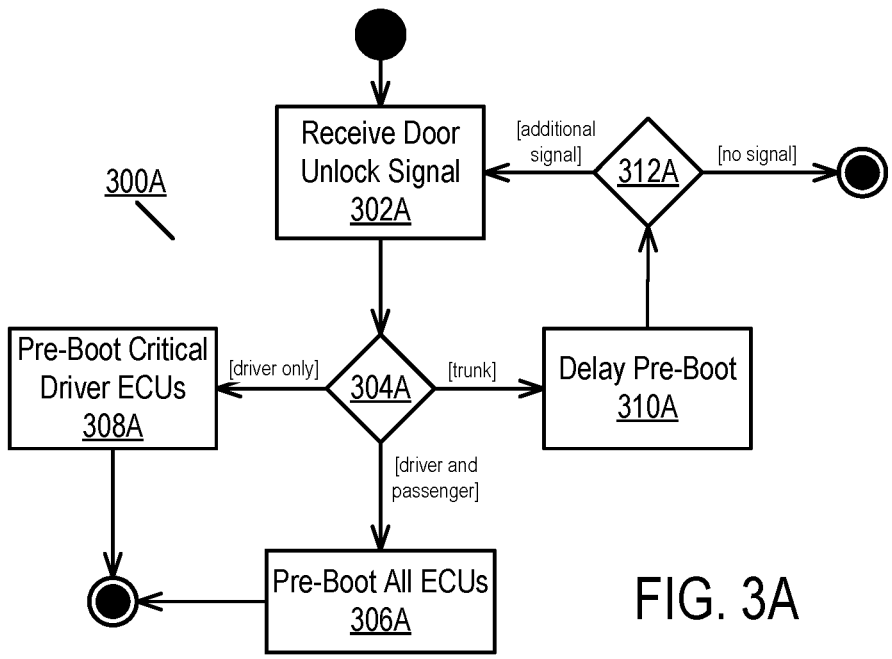
FIG. 3A is a flow diagram illustrating a method for pre-booting an ECU based on monitoring a door unlock signal according to some embodiments of the disclosure.

Specific details on monitoring a locking subsystem are described in more detail in FIG. 3A. In general, the specific ECUs involved in door locking and unlocking may vary, but commands to lock or unlock doors are transmitted over a vehicles CAN (or similar) bus. In block 202, the method (200a) sniffs the bus to determine when an unlock command has been broadcast. The method (200a) may further determine whether the driver's side door was unlocked, all doors were unlocked, or whether the trunk was unlocked (or a combination thereof). If the method (200a) detects that a door was unlocked (block 204), the method (200a) transmits a signal to each ECU requiring pre-booting (block 226). If no signal is sniffed, the method (200a) continues.

In blocks 206 and 208, the method (200a) monitors the weight of a seat (206) and if that weight changes (208), initiates pre-booting of one or more ECUs (226).

In the illustrated embodiment, one or more seats of a vehicle are equipped with a pressure sensor, silicon bladder (optional), and a per-seat ECU. As an occupant sits on a seat, the pressure sensor transmits the weight of the occupant to the in-seat ECU and the in-seat ECU broadcasts the weight to other ECUs over a CAN (or similar) bus. In general, in-seat ECUs broadcast weights to enable or disable passenger airbags based on the perceived weight of the occupant (adult vs. child) as well as to turn on or off seat belts indicators.

In one embodiment, the method (200a) monitors only the CAN bus to detect a change in the weight placed on driver's seat. Details of this operation are described in FIG. 3B. In other embodiments, the method (200a) monitors the weights of all seats and selectively pre-boots ECUs based on the weights in each seat and based on which seats signal a change in weight. For example, if the driver's seat does not change weight but the rear seats change weight, the system may selectively pre-boot the infotainment ECU controlling a rear, headset display. Alternatively, or in conjunction with the foregoing, when a change in driver's seat weight is detected, the method (200a) may pre-boot driver-centric ECUs such as navigation, dashboard, etc. Additionally, the method (200a) can be configured to not pre-boot an ECU based on a weight change until a weight threshold is crossed. In some embodiments, this threshold can be dynamically updated using a predictive model based on sensing weights and associating seats and weights with known start conditions.

In blocks 210 and 212, the method (200a) monitors the electric charger of a vehicle (210) and determines whether a charging cable is disconnected from the charging port (212); if so, the method (200a) initiates pre-booting of one or more ECUs (226).

In some embodiments where the vehicle comprises an electric or hybrid vehicle, a charging port of the vehicle is equipped with its own ECU that controls the charging of the vehicle battery. This ECU transmits various signals representing the charge state as well as whether a charger has been disconnected from the vehicle. The method (200a) illustrated monitors the CAN bus for these messages indicating a disconnect and upon detecting that the charger was disconnected begins to pre-boot one or more ECUs.

In blocks 214 and 216, the method (200a) monitors for a nearby driver or other entity (214) and, in response to detecting a nearby person (216), initiates pre-booting of one or more ECUs (226).

In one embodiment, the method (200a) monitors for a nearby driver by determining if a known wireless signal is within range of the vehicle. In a first embodiment, this may comprise detecting a radio signal from a vehicle's electronic key or key fob. In a second embodiment, this may comprise detecting (via near-field communication (NFC) or Bluetooth signaling) whether a known user's mobile phone (or other type of portable device) is nearby.

In some embodiments, the method (200a) only triggers pre-booting when the detected signal is within a pre-set distance from the vehicle. The method (200a) may estimate the distance of the signal by analyzing the signal strength of the received signal using known formulae. In other embodiments, the method (200a) may detect the signal and utilize one or more onboard devices to determine the distance. For example, sonar, Lidar, or radar transceivers may be used to determine the distance of a user in response to detecting the signal.

In some embodiments, the method (200a) may also determine the direction of movement of the signal. In these embodiments, the method (200a) may sample the signal strengths over a window of time to determine if the signal is approaching, departing, or moving parallel. If the signal is approaching, the method (200a) may then trigger block 216. If the method (200a) is departing or moving parallel the method (200a) may ignore the signal until it begins an approach.

In blocks 218 and 202, the method (200a) monitors a bus for an over-the-air (OTA) command (218) and upon receiving a command (220), initiates pre-booting of one or more ECUs (226).

In some embodiments, an operator of the vehicle may operate a mobile device equipped with an app that connects to one or more subsystems of a vehicle. These commands may be received by a dedicated ECU (e.g., including a cellular transceiver) that then instructs other ECUs to perform functions based on the received OTA command.

In the illustrated embodiment, the method (200a) monitors the CAN (or similar) bus of a vehicle to determine if any such OTA commands have been received. In some embodiments, the method (200a) further analyzes the type of OTA commands to determine whether to pre-boot ECUs. For example, if the OTA command comprises a command to lock the doors of the vehicle, the method (200a) may forego pre-booting ECUs. However, if the OTA command comprises an unlock door command or command to start the climate control system, the method (200a) may determine to pre-boot the ECUs.

In blocks 222 and 224 the method (200a) polls a behavioral model (222) and determines if the current time matches a predicted time that the user will start a vehicle (224). If so, the method (200a) initiates pre-booting of one or more ECUs (226).

Figure 3B:
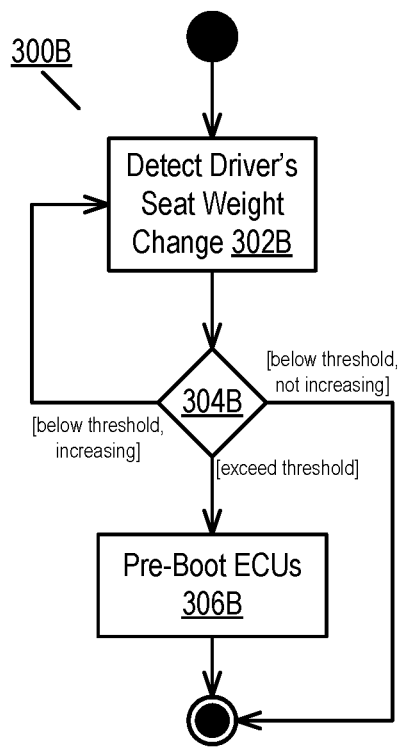
FIG. 3B is a flow diagram illustrating a method for pre-booting an ECU based on a change in weight on a vehicle seat according to some embodiments of the disclosure.
Figure 3C:
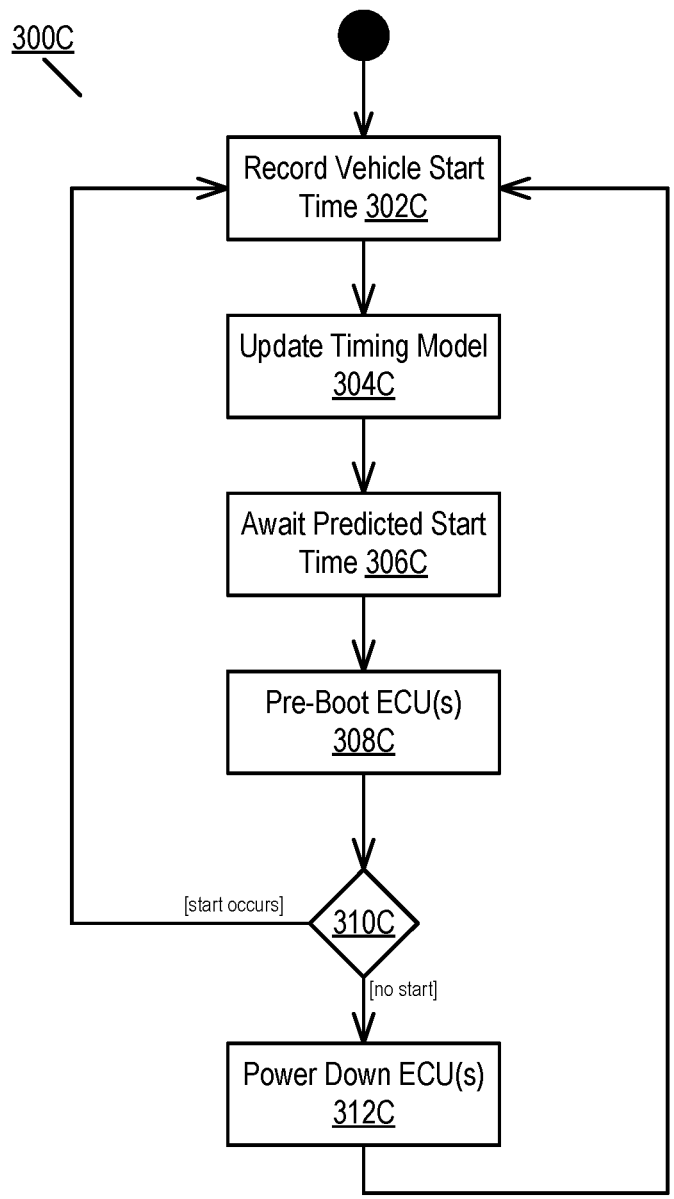
FIG. 3C is a flow diagram illustrating a method for updating and using a predictive model for pre-booting an ECU according to some embodiments of the disclosure.

As described more fully in FIG. 3C, the method (200a) can continuously update a model of vehicle start times and trends. For instance, a model can synthesize that a user generally starts a vehicle between 8:00 and 8:30 AM on weekdays and does not regularly start the same vehicle on weekends. Various algorithms may be used to perform this type of sequence prediction (i.e., given multiple days of events, predicting the next n events) such as DG (Dependency Graph), All-k-order Markov, TDAG (Transition Directed Acyclic Graph), PPM (Prediction by partial matching), CPT (Compact Prediction Tree) and CPT+ models. In some embodiments, these models may continuously be refined based on the results of the prediction (discussed in FIG. 3C).

The illustrated embodiments in FIG. 2A illustrate a serial set of conditions checked by the method (200a). Alternatively, as described above, FIG. 2B illustrates the same six conditions executed in parallel. The details of individual blocks (202 through 226) will not be repeated for FIG. 2B and reference is made to the descriptions presented for those corresponding blocks in FIG. 2A. Notably, in FIG. 2B, each condition is tested independently of the others. If all conditions fail, the method (200b) ends. However, if at least one passes, the method (200b) pre-boots the ECUs (block 226).

As can be seen more or fewer conditions can be added to the method (200b) according to needs of the system.

FIG. 3A is a flow diagram illustrating a method for pre-booting an ECU based on monitoring a door unlock signal according to some embodiments of the disclosure. Various architectural details of ECUs involved in door locking and unlocking were described in the descriptions of blocks 202 and 204 of FIG. 2A and are not repeated herein.

In block 302a, the method (300a) receives a door unlock signal. As described above, in some embodiments this signal can comprise a message broadcast on a CAN bus or similar bus. A theoretical CAN message for door unlocking may comprise:

| COMMAND | DOOR 0 | DOOR 1 | DOOR 2 | DOOR 3 | TRUNK |
| --- | --- | --- | --- | --- | --- |
| UNLOCK | 1 | 0 | 0 | 0 | 0 | where "Command" is either lock/unlock and doors 0 through 3 and trunk are bit fields indicating whether the command should apply to the respective door/trunk. Precise details of a CAN message for unlocking/locking doors are not intended to be limiting and are provided simply as examples. As part of block 302a, the method (300a) filters out any commands that indicate that a door or trunk should be unlocked.

In block 304a, the method (300a) then sorts commands based on which of the doors or trunk are to be unlocked. As indicated above, this may comprise inspecting the unlock command to determine which doors or trunk are to be unlocked. In other embodiments, the unlock message may be directed to a specific ECU in a door or trunk. In this embodiment, the method (300a) can extract the identifier of the ECU and map the ECU to a door or trunk.

In block 306a, the method (300a) pre-boots all ECUs if the unlock signal is directed to both the driver door and one or more passenger doors. Generally, in operation, this scenario encompasses when the user unlocks all doors of the vehicle. In some embodiments, block 304a includes a brief delay before executing to compensate for an operator first unlocking their door and then unlocking other doors or the trunk. As illustrated, if more than one door is opened the method (300a) pre-boots all ECUs in the vehicle.

In block 308a, the method (300a) only pre-boots critical driver ECUs if only the driver's side door is unlocked. In this scenario, the method (300a) selectively pre-boots only those ECUs that are used by the driver. For instance, navigation and dashboard ECUs as well as climate control and operational ECUs may be pre-booted. In contrast, back-seat entertainment ECUs may not be pre-booted.

In block 310a, the method (300a) delays pre-booting any ECUs upon determining that the user has unlocked the trunk. In this scenario, the user unlocks the trunk without unlocking any door thus it can be assumed that the user is not immediately entering the vehicle. In this case, the method (300a) delays pre-booting (310a) and waits to determine if another unlock signal (or other conditions discussed in FIG. 2A) is received in block 312a. If another signal is received (e.g., unlocking the driver's side door), the method (300a) executes the preceding blocks. If no further signal is received, the method (300a) ends. In some embodiments, the method (300a) can further detect a signal from a trunk ECU that the trunk was closed, indicating the user has simply used the trunk without entering the vehicle.

FIG. 3B is a flow diagram illustrating a method for pre-booting an ECU based on a change in weight on a vehicle seat according to some embodiments of the disclosure. Various architectural details of ECUs involved in weight detection were described in the descriptions of blocks 206 and 208 of FIG. 2A and are not repeated herein.

In block 302b, the method (300b) detects a seat weight change.

As discussed above, an in-seat ECU detects a change in weight and broadcasts the weight detected over a CAN (or similar) bus. In block 302b, the method (300b) detects this message including the weight and seat identifier by sniffing the bus.

In block 304b, the method (300b) makes two determinations. First, the method (300b) determines whether the registered weight is above a pre-determined threshold. Next, the method (300b) determines if the weight is increasing or decreasing.

In the illustrated embodiment, the pre-determined threshold may comprise a static value based on the average human weight. In other embodiments, the threshold may be set to an initial value and dynamically adjusted based on the measured weight of the occupants. In the first determinization, the method (300b) determines if the sensed weight is below this threshold (indicating that the weight change may not be attributed to a human) or above this threshold (indicating that a human is likely sitting on the seat).

The second determination comprises determining if the weight is increasing or decreasing. In one embodiment, the method (300b) makes this determination by rapidly sampling the weight to determine if the value is increasing or decreasing.

If the weight exceeds the pre-defined threshold, the method (300a) pre-boots the ECUs (block 306b) as this indicates that a human occupant is sitting in a seat. Alternatively, if the weight is below the threshold but is increasing, the method (300b) re-executes blocks 302b and 304b until the weight exceeds threshold or stops changing. This situation, while rare, indicates that a user may be in the process of sitting down or, alternatively, that a light weight object is being placed on a seat. Finally, if the weight is below a threshold and not increasing (i.e., is decreasing or staying constant), the method (300b) ends.

FIG. 3C is a flow diagram illustrating a method for updating and using a predictive model for pre-booting an ECU according to some embodiments of the disclosure.

In block 302c, the method (300c) records a vehicle start time.

In one embodiment, the vehicle start time corresponds to a start time when a start condition is detected (FIG. 1, block 108). In one embodiment, the start time comprises a day and time. In one embodiment, the start time is stored with a log of start times and is identified by sniffing a CAN bus for ignition start commands.

In block 304c, the method (300c) updates a timing model using the vehicle start time.

As described above, the timing model comprises a time-based predictive model that accepts a day and/or time as an input parameter and outputs a classification as to whether the current time corresponds to a pre-boot condition. Alternatively, the model can output the next expected time that a pre-boot condition will occur. In some embodiments, the model can comprise a DG (Dependency Graph), All-k-order Markov, TDAG (Transition Directed Acyclic Graph), PPM (Prediction by partial matching), CPT (Compact Prediction Tree), CPT+, or similar model.

In block 306c, the method (300c) awaits the next predicted start time.

As a first example, if a user starts their vehicle between 8:00 and 8:30 on weekdays and the input time is 5:00 on a weekday, the model will output a negative result. Alternatively, the model can output the number of minutes (180) until next predicted start time.

In some embodiments, the method (300c) periodically polls the model to retrieve the next start time. Thus, the method (300c) polls the model at time to and updates predicted start time $t_{p0}$. Regardless of whether the vehicle starts at $t_{p0}$, the method (300c) will then re-poll the model at $t_{p0}$+c, where c comprises a fixed, positive amount of time (e.g., 30 seconds or 2 minutes).

In other embodiments, the method (300c) can poll the model more infrequently and schedule one or more times when the model predicts that the vehicle will be started. Upon a misprediction, the method (300c) can then re-poll the model to obtain a new set of scheduled start times.

In step 308c, once the predicted start time occurs, the method (300c) pre-boots the ECUs as described previously. The method (300c) then determines if a start has occurred (310c). If so, the method (300c) records the start time (302c) and updates the timing model (304c) and loops through the remaining method steps indefinitely.

Alternatively, if the vehicle is never started, the method (300c) powers down the ECUs (312c) and correspondingly records the false start and updates the model (302c, 304c) to improve the prediction of the model.

Figure 3D:
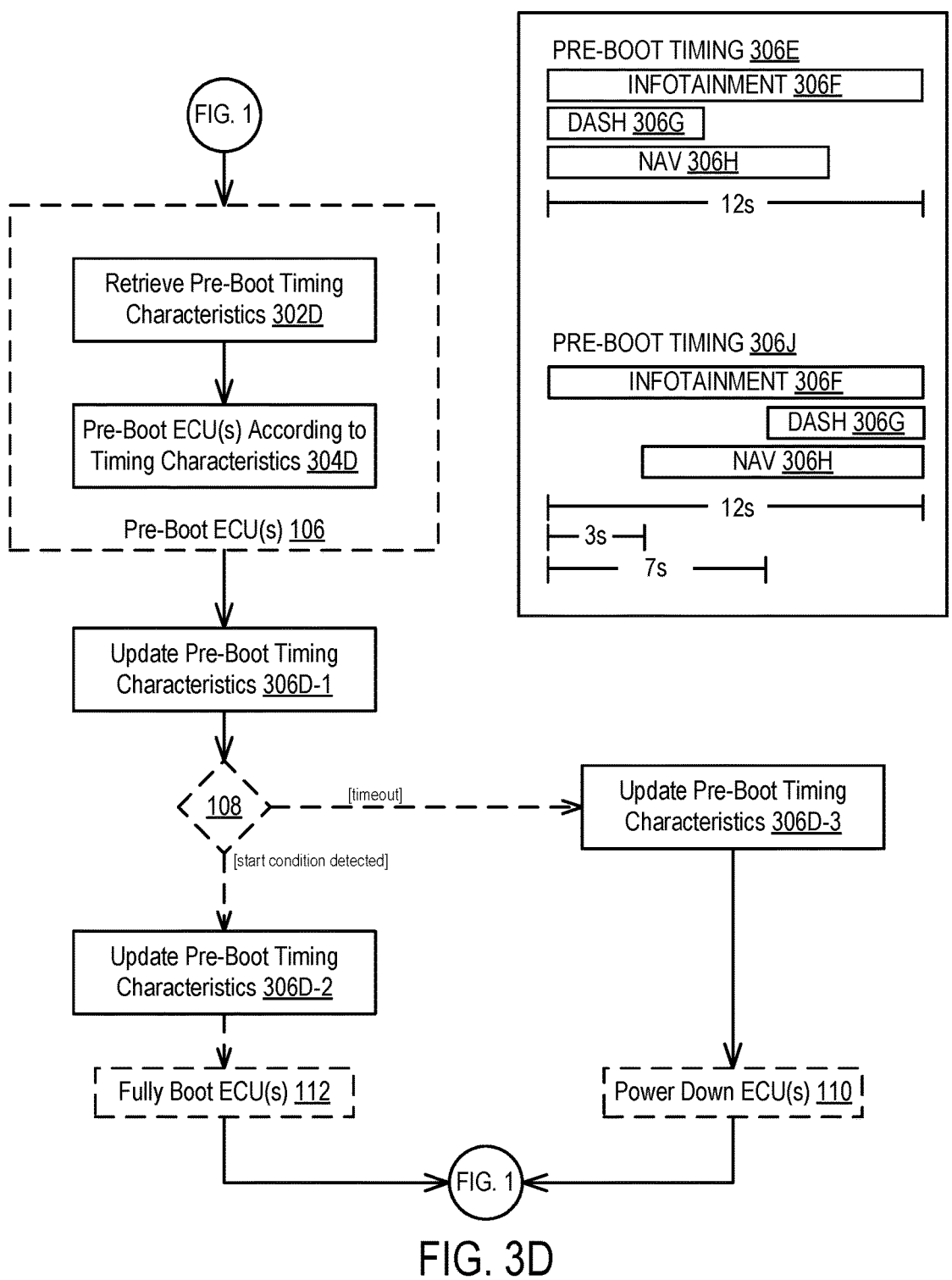
FIG. 3D is a flow diagram illustrating a method for using and updating pre-boot timing characteristics according to some embodiments of the disclosure.

FIG. 3D is a flow diagram illustrating a method for using and updating pre-boot timing characteristics according to some embodiments of the disclosure.

The illustrated method (300d) references various blocks (106, 108, 110, and 112) of FIG. 1 and, indeed, illustrates various modifications to the methods described in FIG. 1. Details of correspondingly numbered blocks are not repeated herein. In the illustrated embodiment, the pre-booting of ECUs (block 106) is modified and new blocks (306d-1, 306d-2, 306d-3) are inserted before and after the timeout detection (108).

During the pre-boot process (106), the method (300d) retrieves pre-boot timing characteristics (302d) and pre-boots the ECUs based on these timing characteristics (304d).

As used herein, a pre-boot timing characteristic refers to the amount of time required to pre-boot a given ECU. The amount of time required to get into a pre-boot state can vary among ECU devices. Low-complexity ECUs having minimal hardware will necessarily bypass the BIOS stage (FIG. 6, element 604) quicker than more complicated ECU (e.g., infotainment devices, navigation devices). This is illustrated in pre-boot timing graph (306e) where an infotainment ECU (306f) has a 12 second pre-boot timing, dash ECU (306g) has a five second timing, and navigation ECU (306h) has a nine second timing. In graph (306e), a start condition may occur at nine seconds, wherein the infotainment ECU (306f) is not fully pre-booted. However, the pre-boot phase dictates that all ECUs be in a final pre-boot stage at the same time. Since the underlying BIOS phase cannot usually be shortened, varying the pre-boot start times can be implemented to ensure that all ECUs reach a final state at the same time.

Initially, the pre-boot timing characteristics is empty or is set to a manufacturer default setting. Gradually, as will be discussed, timing characteristics of the ECU pre-boot phase are recorded and the timing characteristics are updated. In this manner, pre-booting of certain ECUs (e.g., infotainment) can be started immediately while another device can be delayed slightly. In some cases, delaying ECU pre-boot may be desirable to prevent unnecessary operations if a false start is detected.

As illustrated, in block 304d, the method uses the pre-boot timing characteristics to selectively defer pre-booting some devices. For instance, as illustrated in graph (306j), infotainment ECU (306f) is pre-booted immediately, while dash ECU (306g) is deferred for seven seconds and navigation ECU (306h) is deferred for three seconds. All ECUs then are pre-booted at the same time.

To generate the timing characteristics, the method (300d) employs one or more probe points (306d-1, 306d-2, 306d-3) to update the pre-boot timing characteristics. Some or all of probe points (306d-1, 306d-2, 306d-3) may be implemented in operation. The first point (306d-1) periodically updates the timing prior to timing out or detecting a start command. This ensure that quickly pre-booting devices can be identified. For each probe point, the pre-boot timing can be identified by monitoring a CAN bus for ready signal from each pre-booting ECU. In a second probe point (306d-2), the start condition is trigger and the ECUs should all be pre-booted. However, probe point (306d-2) can be used to detect any ECUs that are not fully pre-booted, thus capturing slow-booting ECUs. A third probe point (306d-3) is inserted after detecting a timeout and operates similar to probe point (306d-2).

In some embodiments, the pre-boot phase does not risk lasting longer than the time before start. In this scenario, the timing characteristics can still be used to determine when to start the pre-boot process. For instance, if one or more ECUs take a significant time to pre-boot, the method (300d) can use the timing characteristics to increase the range in which to detect whether a person is approaching a vehicle.

Figure 4:
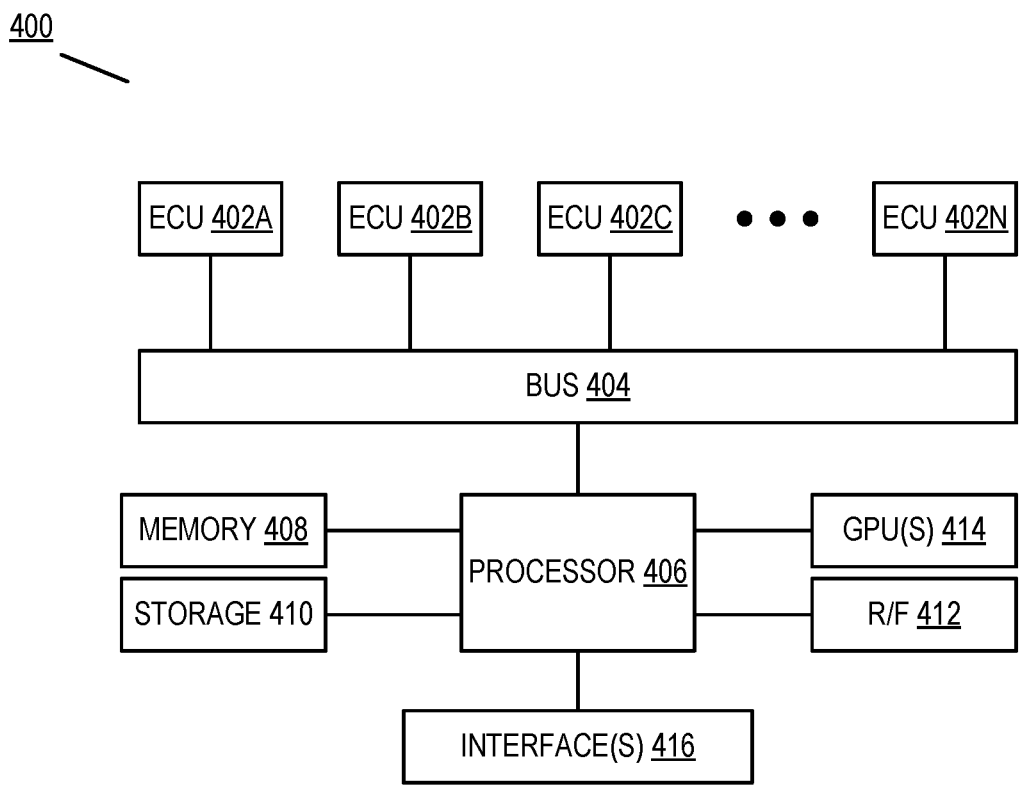
FIG. 4 is a block diagram illustrating a system for pre-booting an ECU according to some embodiments of the disclosure.

FIG. 4 is a block diagram illustrating a system (400) for pre-booting an ECU according to some embodiments of the disclosure.

In FIG. 4, a vehicle (400) can comprise any type of vehicle (e.g., automobile, boat, etc.). Generally, vehicle can comprise any superstructure housing various discrete computing systems and a vehicle is provided as an example. Vehicle (400) includes one or more ECUs (402a-402n). Examples of ECUs include door control unit (DCU), engine control unit, electric power steering control unit (PSCU), human-machine interface (HMI), powertrain control module (PCM), seat control unit, speed control unit (SCU), telematic control unit (TCU), transmission control unit (TCU), brake control module (BCM; ABS or ESC), or battery management system (BMS) devices. While described primarily in the context of ECU devices, any type of embedded computing system may be used in the embodiments disclosed herein and embodiments referencing ECU devices are provided as examples. An exemplary configuration of an ECU is provided in FIG. 5, and that discussion is not repeated herein.

ECUs (402a-402n) are each connected to a bus (404). In some embodiments, the bus (404) comprises a CAN Bus, FlexRay MOST bus, or any other type of bidirectional communication bus.

The processing side of the system includes one or more processors (406), short-term memory (408), an RF system (412), graphics processing units (GPUs) (414), long-term storage (410) and one or more interfaces (418).

The one or more processors (406) may comprise central processing units, FPGAs, or any range of processing devices needed to support the operations of the autonomous vehicle. Memory (408) comprises DRAM or other suitable volatile RAM for temporary storage of data required by processors (406). RF system (412) may comprise a cellular transceiver and/or satellite transceiver. Long-term storage (410) may comprise one or more high-capacity solid-state drives (SSDs). In general, long-term storage (410) may be utilized to store, for example, high-definition maps, routing data, and any other data requiring permanent or semi-permanent storage. GPUs (414) may comprise one more high throughput GPU devices for processing data received from other vehicle subsystems. Finally, interfaces (418) may comprise various display units positioned within the vehicle (e.g., an in-dash screen). In the illustrated embodiment, the memory (408) and/or storage (410) includes pre-booting software configured to execute the methods described previously.

Figure 5:
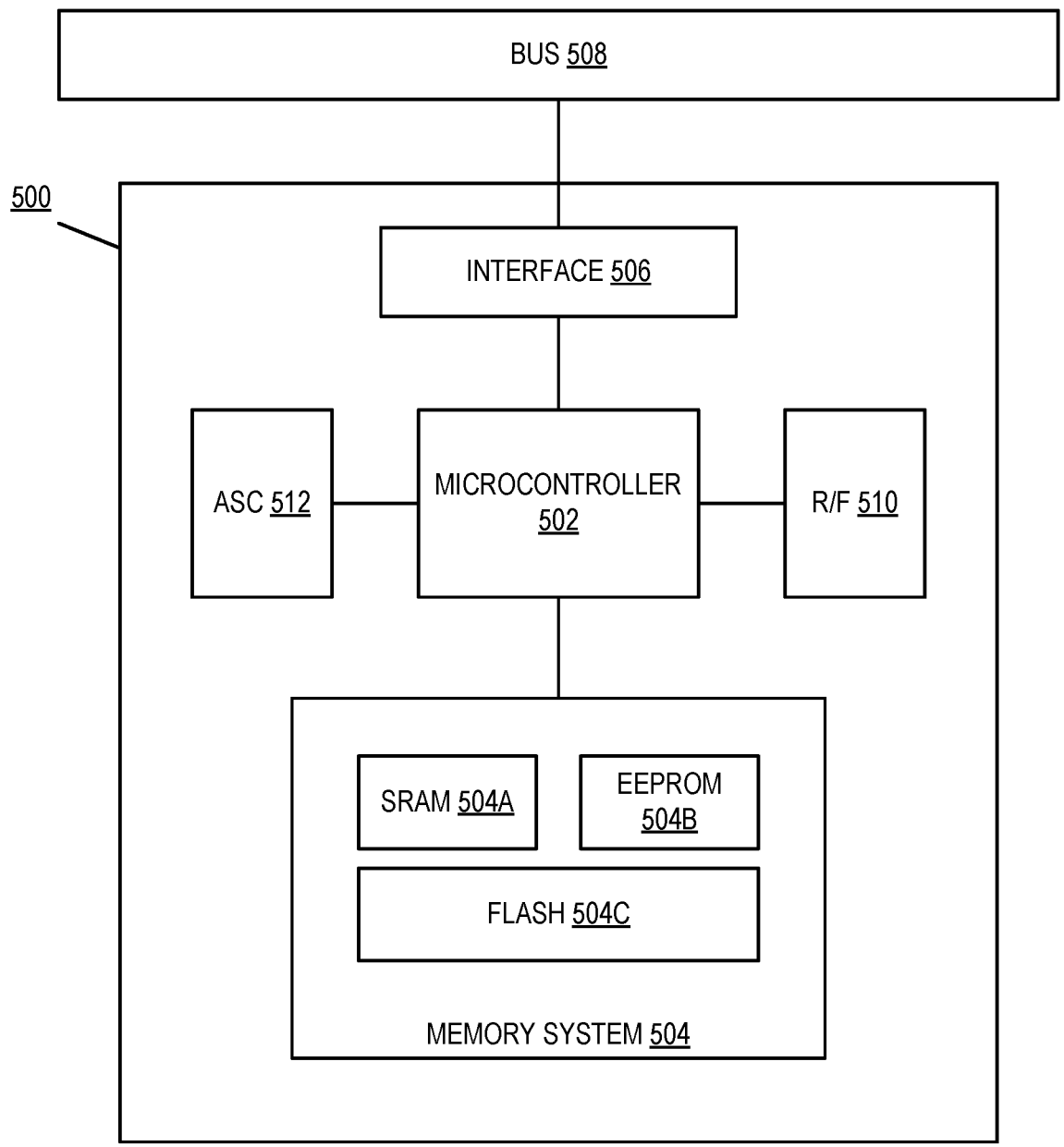
FIG. 5 is a block diagram of an ECU according to some embodiments of the disclosure.

FIG. 5 is a block diagram of an ECU according to some embodiments of the disclosure.

In the illustrated embodiment, an ECU (500) is communicatively coupled to a bus (508) via an interface (506). As discussed above, the bus (508) may comprise a CAN, FlexRay, MOST bus or similar type of bus. Correspondingly, the interface (506) may comprise a similar interface for accessing the specific type of bus used.

The ECU (500) additionally includes a microcontroller (502), R/F subsystem (510), application-specific components (ASC) (512) and memory system (504). In the illustrated embodiment, the microcontroller (502) can comprise a processor or smaller microcontroller configured to control operations of the ECU (500). In some embodiments, the microcontroller (502) accesses program instructions stored in the memory system (504) and, according to those instructions, drives ASC (512). Examples of ASC (512) include actuators for door controls, display units for infotainment ECUs, transmission control devices for TCUs, and various other controls. The types of ASCs employed by the ECU (500) are not limiting and any type of ASCs may be employed by the ECU (500).

ECU (500) additionally includes an R/F system (510). In the illustrated embodiment, the R/F system (510) may include one or more radios or transceivers for communicating with wireless networks. R/F system (510) may include Bluetooth, Wi-Fi or cellular radios or satellite transceivers. In some embodiments, R/F system (510) includes a combination of radios or transceivers. In some embodiments, ECU (500) may not include an R/F system (510) and may instead utilize a vehicle-wide R/F system, as described previously.

Microcontroller (502) manages memory system (504). In the illustrated embodiment, memory system (504) includes SRAM (504*a*), EEPROM (504*b*), and Flash storage (504*c*). In the illustrated embodiment, SRAM (504*a*) may be utilizes as an L1 or L2 cache for microcontroller (502). Similarly, EEPROM (504*b*) may be used as firmware storage for the ECU (500). The specific details (or presence) of SRAM (504*a*) and EERPOM (504*b*) is not limiting.

Memory system (504) additionally includes a Flash storage device (504*c*). In the illustrated embodiment, the Flash storage device (504*c*) comprises a NAND Flash storage device soldered to a PCB and connected (via the PCB) to the other components depicted in FIG. 5. Flash storage device (504*c*) is utilized to storage operating code as well as data used by the ECU (500) as described previously.

The present disclosure has been described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used above may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a general-purpose processor, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

What is claimed is:

1. A method comprising:
operating a pre-boot electronic control unit (ECU) in an always-on state;
detecting, by the pre-boot ECU, a pre-boot condition based on vehicle interactions;
in response to detecting the pre-boot condition, initiating pre-booting of one or more other ECUs by initializing bootloaders without loading operating systems;
monitoring for a start condition within a time window; and
based on detecting the start condition within the time window, instructing the initialized bootloaders to load the operating systems of the pre-booted ECUs.

2. The method of claim 1, wherein detecting the pre-boot condition comprises detecting an unlock signal for a vehicle door on a vehicle bus.

3. The method of claim 2, wherein initiating pre-booting comprises:
pre-booting all ECUs when the unlock signal is for a driver's door and one or more passenger doors; and
pre-booting only critical driver ECUs when the unlock signal is for only the driver's door.

4. The method of claim 1, wherein detecting the pre-boot condition comprises detecting a change in weight on a vehicle seat.

5. The method of claim 4, wherein initiating pre-booting comprises pre-booting the one or more ECUs when the change in weight exceeds a threshold.

6. The method of claim 1, wherein detecting the pre-boot condition comprises detecting disconnection of a charging cable from a vehicle charging port.

7. The method of claim 1, wherein detecting the pre-boot condition comprises detecting a wireless signal from a user device within a predetermined distance of the vehicle.

8. The method of claim 1, wherein detecting the pre-boot condition comprises determining a current time matches a predicted start time based on a model.

9. The method of claim 8, further comprising:
recording an actual start time when the start condition is detected; and
updating the model based on the actual start time.

10. The method of claim 1, further comprising:
accessing pre-boot timing data indicating boot times for the one or more ECUs; and
staggering initiation of pre-booting for the one or more ECUs based on the pre-boot timing data.

11. A method comprising:
detecting, by a monitoring ECU, a pre-boot trigger based on vehicle state data received over a vehicle bus;
in response to detecting the pre-boot trigger, the monitoring ECU initiating pre-booting of a plurality of other ECUs by sending pre-boot commands that initialize bootloaders without loading operating systems;
after a timeout period, determining whether a start command was received; and when the start command was received, sending instructions for the initialized bootloaders to complete booting by loading the operating systems.

12. The method of claim 11, wherein the pre-boot trigger comprises an unlock signal for a vehicle door detected on the vehicle bus.

13. The method of claim 11, wherein the pre-boot trigger comprises a change in weight detected for a vehicle seat.

14. The method of claim 11, wherein the pre-boot trigger comprises disconnection of a charging cable detected by a charging system ECU.

15. The method of claim 11, further comprising:
accessing pre-boot timing characteristics for the plurality of ECUs; and
varying timing of the pre-boot commands sent to each ECU based on the pre-boot timing characteristics.

16. The method of claim 11, wherein the monitoring ECU selectively initiates pre-booting of a subset of the plurality of other ECUs based on a type of the detected pre-boot trigger.

17. A method comprising:
monitoring, by a vehicle system ECU, a vehicle bus for pre-boot triggering events;
detecting a pre-boot triggering event based on data carried over the vehicle bus;
determining a subset of vehicle ECUs to pre-boot based on a type of the detected pre-boot triggering event;
transmitting pre-boot commands to the determined subset of ECUs to initiate pre-booting by initializing bootloaders without loading operating systems;
monitoring for a start command for a period after the pre-boot commands;
when the start command is received, instructing the initialized bootloaders to complete booting by loading the operating systems; and
when the start command is not received, instructing the subset of ECUs to power down.

18. The method of claim 17, wherein the pre-boot triggering event comprises a door unlock command detected on the vehicle bus.

19. The method of claim 18, wherein determining the subset comprises:
selecting all ECUs when the unlock command is for a driver's door and passenger doors; and
selecting only critical driver ECUs when the unlock command is for only the driver's door.

20. The method of claim 17, wherein the pre-boot triggering event comprises a weight change detected for a vehicle seat.

21. A system comprising:
a pre-boot electronic control unit (ECU) configured to operate in an always-on state;
a vehicle bus communicatively coupling the pre-boot ECU to one or more other ECUs;
wherein the pre-boot ECU is configured to:
detect a pre-boot condition based on vehicle interactions;
in response to detecting the pre-boot condition, initiate pre-booting of the one or more other ECUs by initializing bootloaders without loading operating systems;
monitor for a start condition within a time window; and
based on detecting the start condition within the time window, instruct the initialized bootloaders to load the operating systems of the pre-booted ECUs.

22. The system of claim 21, wherein the pre-boot ECU is configured to detect the pre-boot condition by detecting an unlock signal for a vehicle door on the vehicle bus.

23. The system of claim 22, wherein the pre-boot ECU is configured to:

pre-boot all ECUs when the unlock signal is for a driver's door and one or more passenger doors; and
pre-boot only critical driver ECUs when the unlock signal is for only the driver's door.

24. The system of claim 21, further comprising a vehicle seat having a weight sensor, wherein the pre-boot ECU is configured to detect the pre-boot condition by detecting a change in weight on the vehicle seat based on data from the weight sensor.

25. The system of claim 24, wherein the pre-boot ECU is configured to pre-boot the one or more ECUs when the change in weight exceeds a threshold.

26. The system of claim 21, further comprising a charging system ECU, wherein the pre-boot ECU is configured to detect the pre-boot condition by detecting disconnection of a charging cable from a vehicle charging port based on data from the charging system ECU.

27. The system of claim 21, wherein the pre-boot ECU comprises a wireless transceiver and is configured to detect the pre-boot condition by detecting a wireless signal from a user device within a predetermined distance of the vehicle.

28. The system of claim 21, wherein the pre-boot ECU is configured to detect the pre-boot condition by determining a current time matches a predicted start time based on a model.

29. The system of claim 28, wherein the pre-boot ECU is further configured to:
record an actual start time when the start condition is detected; and
update the model based on the actual start time.

30. The system of claim 21, wherein the pre-boot ECU is further configured to:
access pre-boot timing data indicating boot times for the one or more ECUs; and
stagger initiation of pre-booting for the one or more ECUs based on the pre-boot timing data.

* * * * *